United States Patent
Tsuchida et al.

(10) Patent No.: US 10,046,600 B2
(45) Date of Patent: Aug. 14, 2018

(54) PNEUMATIC TIRE

(71) Applicant: SUMITOMO RUBBER INDUSTRIES, LTD., Kobe-shi, Hyogo (JP)

(72) Inventors: Tsuyoshi Tsuchida, Kobe (JP); Tatsuya Miyazaki, Kobe (JP); Soh Ishino, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/913,225

(22) PCT Filed: Aug. 18, 2014

(86) PCT No.: PCT/JP2014/071526
§ 371 (c)(1),
(2) Date: Feb. 19, 2016

(87) PCT Pub. No.: WO2015/040991
PCT Pub. Date: Mar. 26, 2015

(65) Prior Publication Data
US 2016/0200901 A1 Jul. 14, 2016

(30) Foreign Application Priority Data
Sep. 17, 2013 (JP) .................. 2013-192066

(51) Int. Cl.
| | | |
|---|---|---|
| B60C 1/00 | (2006.01) | |
| C08K 3/04 | (2006.01) | |
| C08K 3/06 | (2006.01) | |
| C08K 3/36 | (2006.01) | |
| C08L 9/00 | (2006.01) | |
| C08L 9/06 | (2006.01) | |

(52) U.S. Cl.
CPC .............. B60C 1/00 (2013.01); B60C 1/0016 (2013.01); C08K 3/04 (2013.01); C08K 3/06 (2013.01); C08K 3/36 (2013.01); C08L 9/00 (2013.01); C08L 9/06 (2013.01); C08K 2201/006 (2013.01)

(58) Field of Classification Search
CPC .... C08L 9/00; C08L 15/00; C08L 9/06; C08L 7/00; B60C 1/0016; B60C 1/00; C08K 3/0033; C08K 3/346; C08K 3/04; C08K 3/06; C08K 3/36; C08K 2201/006
See application file for complete search history.

(56) References Cited

U.S. PATENT DOCUMENTS

| | | | | |
|---|---|---|---|---|
| 3,019,207 A | * | 1/1962 | Crane ................. | C08K 3/0033 524/432 |
| 4,928,896 A | | 5/1990 | Symon | |
| 6,465,579 B1 | * | 10/2002 | Chino ................. | C08K 3/36 525/326.5 |
| 7,288,602 B2 | * | 10/2007 | Thielen ................ | B60C 1/0016 524/432 |
| 2002/0132904 A1 | | 9/2002 | Langstein et al. | |
| 2012/0208964 A1 | | 8/2012 | Kloppenburg et al. | |
| 2012/0225974 A1 | * | 9/2012 | Uno ...................... | B60C 1/0016 523/155 |
| 2014/0011944 A1 | * | 1/2014 | Kondo .................. | C08L 9/00 524/526 |
| 2014/0155521 A1 | | 6/2014 | Miyazaki | |
| 2016/0200901 A1 | | 7/2016 | Tsuchida et al. | |

FOREIGN PATENT DOCUMENTS

| | | |
|---|---|---|
| CN | 102432927 A | 5/2012 |
| CN | 102653603 A | 9/2012 |
| CN | 103085187 A | 5/2013 |
| EP | 2716700 A1 | 4/2014 |
| EP | 3 064 543 A1 | 9/2016 |
| EP | 3 064 544 A1 | 9/2016 |
| JP | 2002-234978 A | 8/2002 |
| JP | 2004-277506 A | 10/2004 |
| JP | 2005-154754 A | 6/2005 |

(Continued)

OTHER PUBLICATIONS

Tokai Carbon, pp. 1-3, Tokai Carbon Co. Ltd, no publication date give, obtained online from: , http://www.tokaicarbon.co.jp/en/products/carbon_b/seast/.*
SBR-1723 TDAE, p. 1,SIBUR, no publication date given, obtained online from: http://sibur-int.com/upload/documents/CKC-30APKM-27(SBR-1723%20TDAE)_.pdf.*
English language translation of JP 2004-277506, pp. 1-9, May 18, 2016.*
International Search Report for PCT/JP2014/071526 (PCT/ISA/210) dated Oct. 7, 2014.

(Continued)

*Primary Examiner* — Alexander Kollias
(74) *Attorney, Agent, or Firm* — Birch, Stewart, Kolasch & Birch, LLP (57) ABSTRACT

Provided is a pneumatic tire including a tread formed from a specified rubber composition, thereby achieving a balanced improvement in fuel economy, wet-grip performance, and abrasion resistance while simultaneously having excellent durability. The present invention relates to a pneumatic tire including a tread formed from a rubber composition, the rubber composition containing: an oil-extended BR having a cis content of 95 mol % or more, a vinyl content of 1 mol % or less, and a weight average molecular weight of 530,000 or more; a SBR having a bound styrene content of 30-50% by mass and a weight average molecular weight of 700,000 or more; silica; and carbon black, the oil-extended BR being synthesized using a rare earth catalyst, the rubber composition containing, based on 100% by mass of rubber solids, 10-67% by mass of the BR component contained in the oil-extended BR and 10-50% by mass of the SBR.

16 Claims, 1 Drawing Sheet

(56) References Cited

FOREIGN PATENT DOCUMENTS

| | | |
|---|---|---|
| JP | 2005-179393 A | 7/2005 |
| JP | 2010-100033 A | 5/2010 |
| JP | 2010-275393 A | 12/2010 |
| JP | 2011-12248 A | 1/2011 |
| JP | 2011-89031 A | 5/2011 |
| JP | 2011-256282 A | 12/2011 |
| JP | 2013-7025 A | 1/2013 |
| JP | 2013-23640 A | 2/2013 |
| JP | 2013-53296 A | 3/2013 |
| JP | 2013-82840 A | 5/2013 |
| WO | WO 2008/044722 A1 | 4/2008 |
| WO | WO 2012/165038 A1 | 12/2012 |

OTHER PUBLICATIONS

Written Opinion of the International Searching Authority for PCT/JP2014/071526 (PCT/ISA/237) dated Oct. 7, 2014.

\* cited by examiner

PNEUMATIC TIRE

TECHNICAL FIELD

The present invention relates to a pneumatic tire including a tread formed from a specified rubber composition.

BACKGROUND ART

Treads of tires are required to have properties including wet-grip performance, fuel economy, and abrasion resistance. Abrasion resistance is important especially for users in the North American market where the average monthly mileage is high. Thus, there is a need to improve abrasion resistance while maintaining wet-grip performance and fuel economy, and even costs.

In general, silica formulations have good wet-grip performance but are inferior in abrasion resistance to carbon black formulations. One possible way to improve abrasion resistance is by increasing the amount of silica or by using fine particle silica having excellent abrasion resistance or a silane coupling agent that strongly binds to polymers. This, however, will increase the cost of the silane coupling agent. Therefore, improving the polymer or the softener is expected to enhance abrasion resistance.

Patent Literature 1 discloses a rubber composition for tire treads whose abrasion resistance, fuel economy, and wet-grip performance are improved by adding a liquid resin having a softening point of −20° C. to 45° C. and a specific silica. This rubber composition still has room for improvement in terms of improving these properties while taking into account costs.

CITATION LIST

Patent Literature

Patent Literature 1: JP 2013-053296 A

SUMMARY OF INVENTION

Technical Problem

The present invention aims to solve the above problem and provide a pneumatic tire including a tread formed from a specified rubber composition, thereby achieving a balanced improvement in fuel economy, wet-grip performance, and abrasion resistance while simultaneously having excellent durability.

Solution to Problem

The present invention relates to a pneumatic tire, including a tread formed from a rubber composition, the rubber composition containing: an oil-extended polybutadiene rubber having a cis content of 95 mol % or more, a vinyl content of 1 mol % or less, and a weight average molecular weight of 530,000 or more; a styrene-butadiene rubber having a bound styrene content of 30 to 50% by mass and a weight average molecular weight of 700,000 or more; silica; and carbon black, the oil-extended polybutadiene rubber being synthesized using a rare earth catalyst, the rubber composition containing, based on 100% by mass of rubber solids, 10 to 67% by mass of a polybutadiene rubber component contained in the oil-extended polybutadiene rubber and 10 to 50% by mass of the styrene-butadiene rubber.

Preferably, relative to 100 parts by mass of the rubber solids, an amount of the silica is 15 to 125 parts by mass, an amount of the carbon black is 3 to 70 parts by mass, and a combined amount of the silica and the carbon black is 60 to 135 parts by mass.

A total amount of sulfur derived from crosslinking agents is preferably 0.5 to 1.4 parts by mass relative to 100 parts by mass of the rubber solids.

The styrene-butadiene rubber is preferably an oil-extended emulsion-polymerized styrene-butadiene rubber having a weight average molecular weight of 900,000 or more.

An amount of additionally added oil is preferably 7 parts by mass or less relative to 100 parts by mass of the rubber solids.

The rubber composition preferably contains 10 parts by mass or more of carbon black having a nitrogen adsorption specific surface area of 130 $m^2/g$ or more relative to 100 parts by mass of the rubber solids.

Advantageous Effects of Invention

Since the pneumatic tire of the present invention includes a tread formed from a rubber composition that contains predetermined amounts of a specific oil-extended polybutadiene rubber, a specific styrene-butadiene rubber, silica, and carbon black, it can achieve a balanced improvement in fuel economy, wet-grip performance, and abrasion resistance while simultaneously having excellent durability.

DESCRIPTION OF EMBODIMENTS

The pneumatic tire of the present invention includes a tread formed from a rubber composition that contains predetermined amounts of a specific oil-extended polybutadiene rubber, a specific styrene-butadiene rubber, silica, and carbon black. Such a pneumatic tire of the present invention has markedly improved abrasion resistance while maintaining good fuel economy and good wet-grip performance. Thus, the balance of these properties can be improved while an increase in costs is suppressed. The pneumatic tire can simultaneously achieve excellent durability such as excellent tipping resistance.

Figure 1:
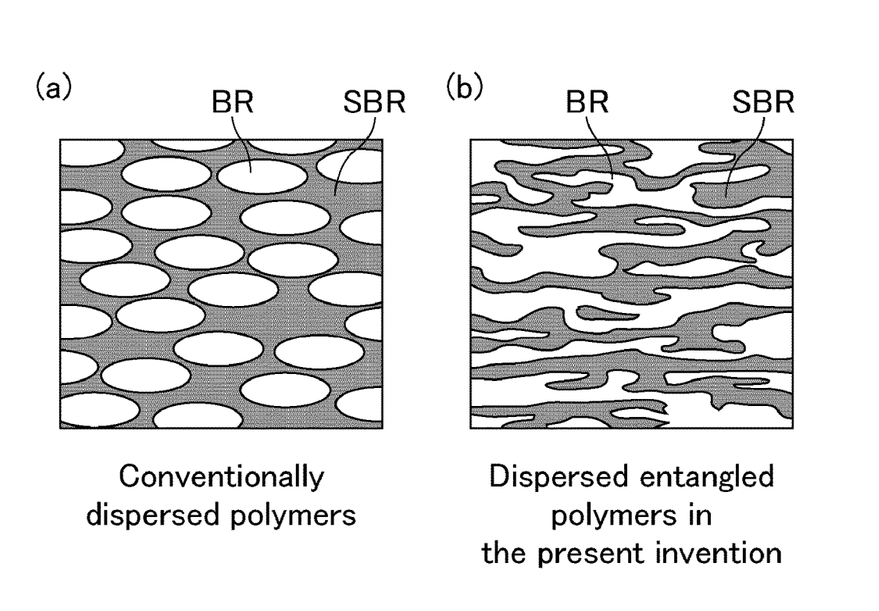
FIG. 1 shows exemplary schematic views of dispersed polymers.

Although it is unclear why the balance of the properties and the durability are improved, it is presumably because of the following mechanism: The specific oil-extended polybutadiene rubber is used as a soft polybutadiene rubber and the specific high molecular weight styrene-butadiene rubber is used as a less breakable polymer. Such two components serve to form a complex entanglement of the polybutadiene phase and the styrene-butadiene phase as shown in FIG. 1 (b). In this case, a large amount of silica is distributed in the polybutadiene phase in which silica is conventionally less miscible, while a large amount of carbon black is distributed in the styrene-butadiene phase in which carbon black is conventionally less miscible. Thus, both fillers are uniformly distributed and dispersed in both rubber phases and therefore the properties are improved.

First, the rubber composition forming the tread is described.

The rubber composition for treads in the present invention contains: an oil-extended polybutadiene rubber (oil-extended BR) synthesized using a rare earth catalyst and having a cis content of 95 mol % or more, a vinyl content of 1 mol % or less, and a weight average molecular weight of 530,000 or more; a styrene-butadiene rubber (SBR) having a bound styrene content of 30 to 50% by mass and a weight average molecular weight of 700,000 or more; silica; and carbon black.

The rare earth catalyst used for the oil-extended BR may be a known one, for example, suitably, a catalyst including a lanthanide rare earth compound. The lanthanide rare earth compound may optionally be used in combination with an organic aluminum compound, an aluminoxane, a halogen-containing compound, or a Lewis base. In particular, neodymium (Nd) catalysts including Nd-containing compounds as the lanthanide rare earth compound are particularly preferred.

Examples of the lanthanide rare earth compound include halides, carboxylates, alcoholates, thioalcoholates, and amides of rare earth metals of atomic numbers 57 to 71. As described above, Nd catalysts are especially preferred because they allow the resulting BR to have a high cis content and a low vinyl content.

The oil-extended BR has a cis content of 95 mol % or more, preferably 96 mol % or more. If the cis content is less than 95 mol %, good abrasion resistance or durability is not obtained. The maximum cis content is not particularly limited, and may be 100 mol %.

The oil-extended BR has a vinyl content of 1 mol % or less, preferably 0.5 mol % or less. If the vinyl content is more than 1 mol %, abrasion resistance may be reduced. The minimum vinyl content is not particularly limited, and may be 0 mol %.

The oil-extended BR has a weight average molecular weight (Mw) of 530,000 or more, preferably 600,000 or more, more preferably 700,000 or more. Conversely, the maximum Mw is not particularly limited, but is preferably 1,000,000 or less, more preferably 950,000 or less. If the Mw is more than 1,000,000, the polymer is less likely to be dispersed and to incorporate the filler and therefore fuel economy tends to deteriorate.

The oil-extended BR refers to a rubber prepared by adding an extender component such as oil to polybutadiene rubber in the production of the polymer. Examples of the extender component include paraffinic oil, aromatic oil, naphthenic oil, mild extraction solvates (MES), and treated distillate aromatic extracts (TDAE). Among these, MES or TDAE is preferred.

The level of oil extension of the oil-extended BR (the amount of the extender component relative to 100 parts by mass of the BR component) is not particularly limited and may be appropriately chosen. Usually, the level is 5 to 100 parts by mass, preferably 10 to 50 parts by mass.

The oil-extended BR may be prepared using a rare earth catalyst by for example known methods, or may be a commercial product. Examples of the commercial product include BUNA-C329 TDAE (rare earth-catalyzed BR synthesized using a Nd catalyst, containing 37.5 parts by mass of TDAE relative to 100 parts by mass of the rubber component, cis content: 95.8 mol %, Mw: 760,000) available from LANXESS and BUNA-CB29 MES (rare earth-catalyzed BR synthesized using a Nd catalyst, containing 37.5 parts by mass of MES relative to 100 parts by mass of the rubber component, cis content: 96.1 mol %, Mw: 737,000) available from LANXESS.

The amount of the BR component (BR solids (BR component excluding the extender component)) contained in the oil-extended BR based on 100% by mass of rubber solids (the solid content of the rubber component in the rubber composition) is 10% by mass or more, preferably 15% by mass or more, more preferably 25% by mass or more. The amount of the BR component is 67% by mass or less, preferably 55% by mass or less, more preferably 50% by mass or less. If the amount is less than 10% by mass, abrasion resistance or durability may deteriorate. If the amount is more than 67% by mass, the compatibility of silica with the rubber component may decreases and fuel economy may deteriorate.

The rubber composition may contain, as a BR constituent, another BR other than the oil-extended BR, for example, non-oil-extended BR.

The combined amount of the BR component contained in the oil-extended BR and the BR component contained in the other BR (the total amount of BR solids) based on 100% by mass of the rubber solids is preferably 15% by mass or more, more preferably 20% by mass or more. Also, the combined amount is preferably 70% by mass or less, more preferably 65% by mass or less. When the combined amount is within the range described above, the effects of the present invention can be sufficiently achieved.

Next, the SBR is described. It has a bound styrene content of 30% by mass or more, preferably 34% by mass or more. Also, the bound styrene content is 50% by mass or less, preferably 46% by mass or less. If the bound styrene content is less than 30% by mass, insufficient wet-grip performance may be obtained. If the bound styrene content is more than 50% by mass, the polymer is less likely to be dispersed and fuel economy may deteriorate.

The SBR has a weight average molecular weight (Mw) of 700,000 or more, preferably 800,000 or more, more preferably 900,000 or more, still more preferably 1,000,000 or more. Conversely, the maximum Mw is not particularly limited, but is preferably 1,500,000 or less, more preferably 1,300,000 or less. If the Mw is less than 700,000, abrasion resistance may be reduced. If the Mw is more than 1,500,000, the polymer is less likely to be dispersed and to incorporate the filler and therefore fuel economy tends to deteriorate.

The SBR preferably has a vinyl content of 5 mol % or more, more preferably 10 mol % or more, still more preferably 15 mol % or more. Also, the vinyl content is preferably 60 mol % or less, more preferably 50 mol % or less. When the vinyl content is within the range described above, the effects of the present invention can be sufficiently achieved.

The SBR is not particularly limited, and examples include emulsion polymerized SBR (E-SBR) and solution polymerized SBR (S-SBR), which may or may not be oil-extended. In view of abrasion resistance, oil-extended E-SBR is especially preferred. Various oil-extended modified SBRs for silica formulations (e.g. oil-extended SBRs having an polymer end or main chain modified with any of various modifiers) may also be used.

When oil-extended SBR is added, it is a rubber prepared by adding an extender component such as oil to styrene-butadiene rubber in the production of the polymer. Examples of the extender component are as described above. Aromatic oil, TDAE, naphthenic oil, and MES are especially preferred.

The level of oil extension of the oil-extended SBR (the amount of the extender component relative to 100 parts by mass of the SBR component) is not particularly limited and may be appropriately chosen. Usually, the level is 5 to 100 parts by mass, preferably 10 to 50 parts by mass.

The SBR may be prepared by known methods, such as anionic polymerization, solution polymerization, or emulsion polymerization, or may be a commercial product. Examples of the commercial product include Nipol 9548 available from Zeon Corporation and 0122 available from JSR Corporation.

The amount of the SBR based on 100% by mass of the rubber solids is 10% by mass or more, preferably 15% by mass or more. Also, the amount is 50% by mass or less, preferably 40% by mass or less. If the amount is less than 10% by mass, wet-grip performance may deteriorate. If the amount is more than 50% by mass, heat build-up is increased and the BR amount decreases and, therefore, fuel economy and abrasion resistance may deteriorate. When oil-extended SBR is used as the SBR, the amount of the SBR refers to the amount of the SBR component (SBR solids (SBR component excluding the extender component)) contained in the oil-extended SBR.

The rubber composition may contain, as a SBR constituent, another SBR other than the SBR.

The combined amount of the SBR component contained in the SBR and the SBR component contained in the other SBR (the total amount of SBR solids) based on 100% by mass of the rubber solids is preferably 30% by mass or more, more preferably 35% by mass or more. Also, the combined amount is preferably 80% by mass or less, more preferably 70% by mass or less. When the combined amount is within the range described above, BR which is effective well against abrasion can be used in an appropriate amount while adjusting the total oil content in the rubber compound to a moderate level, and thus the effects of the present invention can be sufficiently achieved.

Herein, the cis content (the amount of cis-1,4-butadiene units) and the vinyl content (the amount of 1,2-butadiene units) in BR, and the vinyl content in SBR can be measured by infrared absorption spectrometry. The bound styrene content in SBR is determined by $H^1$-NMR analysis. The weight average molecular weights (Mw) of BR and SBR can be determined by the method described in examples.

The blending ratio of the BR component and the SBR component [(mass of BR component)/(mass of SBR component)] in the rubber composition is preferably 20/80 to 80/20, more preferably 30/70 to 70/30, still more preferably 30/70 to 67/33. If the blending ratio is less than 20/80 or more than 80/20, the effects of the present invention tend not to be sufficiently achieved. For use as a tire for light trucks, where the ground contact surface pressure is high and wet-grip performance is naturally enhanced, a relatively small amount of SBR is sufficient.

Examples of the rubber component of the rubber composition other than the BR component and the SBR component include diene rubbers such as isoprene-based rubbers, styrene-isoprene-butadiene rubber (SIBR), chloroprene rubber (CR), or acrylonitrile butadiene rubber (NBR), and non-diene rubbers such as ethylene-propylene-diene rubber (EPDM), butyl rubber (IIR) or halogenated butyl rubber (X-IIR). Among these, diene rubbers are preferred, and isoprene-based rubbers are more preferred in view of fuel economy and durability.

Examples of the isoprene-based rubber include synthetic polyisoprene rubber (IR), natural rubber (NR), and modified natural rubber. Examples of the NR include deproteinized natural rubber (DPNR) and high purity natural rubber (HPNR). Examples of the modified natural rubber include epoxidized natural rubber (ENR), hydrogenated natural rubber (HNR), and grafted natural rubber. Among these, NR or IR is preferred, and NR is more preferred.

When an isoprene-based rubber is added, the amount of the isoprene-based rubber based on 100% by mass of the rubber component is preferably 10 to 30% by mass. With the range described above, the effects of the present invention can be sufficiently achieved.

The rubber composition contains both silica and carbon black as fillers. Out of both fillers, silica tends to be readily incorporated in the SBR, while carbon black tends to be readily incorporated in the oil-extended BR. Accordingly, the combined use of the oil-extended BR, the SBR, silica, and carbon black produces the effects of the present invention.

Non-limiting examples of the silica include dry silica (anhydrous silica) and wet silica (hydrous silica). Wet silica (hydrous silica) is preferred because it has many silanol groups.

The silica preferably has a nitrogen adsorption specific surface area ($N_2SA$) of 80 $m^2/g$ or more, more preferably 100 $m^2/g$ or more. Also, the $N_2SA$ is 280 $m^2/g$ or less, more preferably 250 $m^2/g$ or less. When the $N_2SA$ is within the range described above, the effects of the present invention can be sufficiently achieved.

The $N_2SA$ of the silica is measured in conformity with ASTM D3037-81.

Examples of the carbon black include GPF, FEF, HAF, ISAF, and SAF.

The carbon black preferably has a nitrogen adsorption specific surface area ($N_2SA$) of 50 $m^2/g$ or more, more preferably 100 $m^2/g$ or more, still more preferably 130 $m^2/g$ or more. Also, the $N_2SA$ is preferably 250 $m^2/g$ or less, more preferably 200 $m^2/g$ or less, still more preferably 180 $m^2/g$ or less. If the $N_2SA$ is less than 50 $m^2/g$, abrasion resistance may be reduced. If the $N_2SA$ is more than 250 $m^2/g$, sufficient fuel economy or processability may not be obtained. The $N_2SA$ of the carbon black is determined in conformity with JIS K 6217-2:2001.

The amount of the silica relative to 100 parts by mass of the rubber solids is preferably 15 parts by mass or more, more preferably 20 parts by mass or more. Also, the amount is preferably 125 parts by mass or less, more preferably 120 parts by mass or less. If the amount is less than 15 parts by mass, the amount of filler incorporated in the SBR is small and therefore sufficient wet-grip performance or reinforcing properties (abrasion resistance) may not be obtained. If the amount is more than 125 parts by mass, the amount of filler is too large to disperse the filler easily, and fuel economy may be reduced.

The amount of the carbon black relative to 100 parts by mass of the rubber solids is preferably 3 parts by mass or more, more preferably 5 parts by mass or more. Also, the amount is preferably 70 parts by mass or less, more preferably 65 parts by mass or less. If the amount is less than 3 parts by mass, the amount of filler incorporated in the oil-extended BR is small and thus sufficient abrasion resistance may not be obtained and the rubber may have greatly reduced resistance to degradation by ultraviolet rays. If the amount is more than 70 parts by mass, wet-grip performance or fuel economy may be reduced.

The combined amount of the silica and the carbon black relative to 100 parts by mass of the rubber solids is preferably 60 parts by mass or more, more preferably 65 parts by mass or more. Also, the combined amount is preferably 135 parts by mass or less, more preferably 130 parts by mass or less. If the combined amount is less than 60 parts by mass, abrasion resistance may be reduced. If the combined amount is more than 135 parts by mass, fuel economy may be reduced.

The blending ratio of the silica and the carbon black (mass ratio of silica/carbon black) is preferably 20/80 to 96/4, more preferably 25/75 to 85/15. If the ratio is less than 20/80, fuel economy or wet-grip performance may be reduced. If the ratio is more than 96/4, durability or abrasion resistance may be reduced.

The rubber composition usually contains a crosslinking agent such as sulfur or a hybrid crosslinking agent. The sulfur may be one commonly used in the rubber industry, such as powdered sulfur, precipitated sulfur, colloidal sulfur, insoluble sulfur, highly dispersible sulfur, or soluble sulfur. Examples of the hybrid crosslinking agent include the commercial product KA9188.

In the rubber composition, the total amount of sulfur derived from crosslinking agents relative to 100 parts by mass of the rubber solids is preferably 0.4 parts by mass or more, more preferably 0.5 parts by mass or more, still more preferably 0.8 parts by mass or more. Also, the total amount of sulfur is preferably 1.6 parts by mass or less, more preferably 1.4 parts by mass or less, still more preferably 1.3 parts by mass or less. If the total amount is less than 0.4 parts by mass, vulcanized hardness (Hs) or co-curing with neighboring rubber compounds may be insufficient. If the total amount is more than 1.6 parts by mass, abrasion resistance may deteriorate. The total amount of sulfur derived from crosslinking agents refers to the net sulfur component content in the entire crosslinking agents introduced in the final kneading. For example, when insoluble sulfur (containing oil) is used as a crosslinking agent, it means the net sulfur content excluding the amount of oil.

In the rubber composition, the amount of additionally added oil other than the oil contained in the oil-extended rubber such as the oil-extended BR or oil-extended SBR is preferably 7 parts by mass or less, more preferably 5 parts by mass or less, relative to 100 parts by mass of the rubber solids although the additionally added oil may not be used. The use of the oil-extended rubber can allow for reduction in the amount of oil separately added as a process oil, as a result of which slippage on kneading rotors and slippage between the polymer phases are suppressed during processing and the polymer phases (the rubber component) can be easily mixed, so that they are more likely to be entangled as shown in FIG. 1 (b).

In order to improve wet-grip performance, abrasion resistance, and elongation at break, the rubber composition may contain a coumarone-indene resin having a softening point of −20° C. to 45° C. as a resin. The coumarone-indene resin refers to a resin containing coumarone and indene as monomer components forming the backbone (main chain) of the resin. Examples of monomer components other than coumarone and indene contained in the backbone include styrene, α-methylstyrene, methylindene, and vinyltoluene.

The coumarone-indene resin has a softening point of −20° C. or higher, preferably −10° C. or higher. If the softening point is lower than −20° C., the effect of improving fuel economy or elongation at break may not be sufficiently obtained. The softening point is 45° C. or lower, preferably 40° C. or lower. If the softening point is higher than 45° C., fuel economy or elongation at break tends to deteriorate.

The softening point of the coumarone-indene resin is measured in conformity with JIS K 6220-1:2001 with a ring and ball softening point measuring apparatus and defined as the temperature at which the ball drops down.

When a resin is added, the amount of the resin relative to 100 parts by mass of the rubber component is preferably 1 part by mass or more, more preferably 3 parts by mass or more. Also, the amount is preferably 30 parts by mass or less, more preferably 20 parts by mass or less. If the amount is less than 1 part by mass, the effect of improving fuel economy or elongation at break may not be sufficiently obtained. If the amount is more than 30 parts by mass, sufficient hardness may not be obtained.

In addition to the above-mentioned components, the rubber composition may contain appropriate compounding agents usually used for producing rubber compositions, such as a silane coupling agent, zinc oxide, a stearic acid, a processing aid, an antioxidant, wax, or a vulcanization accelerator.

The rubber composition in the present invention can be prepared by conventionally known methods such as the following method.

First, the components other than sulfur and vulcanization accelerators are compounded (added) in a rubber kneading machine such as a Banbury mixer or an open roll mill and kneaded (base kneading step) to give a kneaded mixture. Then, sulfur and a vulcanization accelerator are compounded (added) to the kneaded mixture and kneaded (F-kneading), followed by vulcanization, whereby a rubber composition can be prepared. The rubber composition is used in treads of tires.

The base kneading step is not particularly limited as long as the rubber component and other components are kneaded. The base kneading step may be carried out in one step or may be divided into, for example, X-kneading for kneading the rubber component, half of silica, and half of a silane coupling agent, and Y-kneading for kneading the kneaded mixture prepared in the X-kneading, the rest of silica, carbon black, the rest of the silane coupling agent, and other components excluding sulfur and vulcanization accelerators.

The pneumatic tire of the present invention can be produced from the rubber composition by conventional methods.

Specifically, the rubber composition prepared by compounding the above-mentioned components, before vulcanization, is extruded and processed into the shape of a tread and then assembled with other tire components on a tire building machine in a conventional manner to build an unvulcanized tire. The unvulcanized tire is heated and pressurized in a vulcanizer to obtain a tire.

The pneumatic tire of the present invention is suitable as a tire for passenger vehicles, large passenger vehicles, large SUVs, heavy duty vehicles such as trucks and buses, or light trucks, and is usable as a winter tire or a studless winter tire in these applications.

EXAMPLES

The present invention is specifically described with reference to, but not limited to, examples below.

The chemicals used in production examples are listed below.

Emulsifier (1): Rosin acid soap available from Harima Chemicals.

Emulsifier (2): Fatty acid soap available from Wako Pure Chemical Industries, Ltd.

Electrolyte: Sodium phosphate available from Wako Pure Chemical Industries, Ltd.

Styrene: Styrene available from Wako Pure Chemical Industries, Ltd.

Butadiene: 1,3-butadiene available from Takachiho Trading Co., Ltd.

Molecular weight regulator: tert-Dodecyl mercaptan available from Wako Pure Chemical Industries, Ltd.

Radical initiator: Paramenthane hydroperoxide available from NOF Corporation

SFS: Sodium-formaldehyde-sulfoxylate available from Wako Pure Chemical Industries, Ltd.

EDTA: Sodium ethylenediaminetetraacetate available from Wako Pure Chemical Industries, Ltd.

Catalyst: Ferric sulfate available from Wako Pure Chemical Industries, Ltd.

Polymerization terminator: N,N'-dimethyldithiocarbamate available from Wako Pure Chemical Industries, Ltd.

Production Example 1

(Oil-extended E-SBR)

An amount of 1,200 g of water, 27 g of the emulsifier (1), 0.9 g of the emulsifier (2), 4.8 g of the electrolyte, 312 g of styrene, 288 g of butadiene, and 0.15 g of the molecular weight regulator were charged into a pressure-proof reactor equipped with a stirrer. The temperature of the reactor was adjusted to 5° C., followed by addition of an aqueous solution containing 0.6 g of the radical initiator and 0.92 g of SFS and an aqueous solution containing 0.42 g of EDTA and 0.3 g of the catalyst to the reactor to cause polymerization. Five hours after the start of polymerization, 1.2 g of the polymerization terminator was added to stop the reaction, thereby obtaining a latex. To the latex was added 225 g of TDAE, and the mixture was left for a period of half a day so that the latex absorbed the oil. The resulting latex was added to an alcohol and the mixture was adjusted to a pH of 3 to 5 using a saturated sodium chloride aqueous solution or formic acid so that the mixture was coagulated to give a polymer crumb. The polymer was dried in a vacuum oven at 40° C. to obtain a solid rubber.

Preparation of Terminal Modifier

An amount of 20.8 g of 3-(N,N-dimethylamino)-propyl-trimethoxysilane (AZmax. Co) was put in a 250-mL graduated flask in a nitrogen atmosphere, and anhydrous hexane (Kanto Chemical Co., Inc.) was then added to give a total amount of 250 mL, whereby a terminal modifier was prepared.

Production Example 2

(Oil-extended S-SBR)

An amount of 18 L of n-hexane, 800 g of styrene (Kanto Chemical Co., Inc.), 1,200 g of butadiene, and 1.1 mmol of tetramethylethylenediamine were charged into a 30-L pressure-proof vessel sufficiently purged with nitrogen, followed by heating to 40° C. Next, 1.8 mL of 1.6 M butyllithium (Kanto Chemical Co., Inc.) was added and then the temperature was raised to 50° C., followed by stirring for 3 hours. Then, 4.1 mL of the terminal modifier was added and the resulting mixture was stirred for 30 minutes. To the reaction solution were added 15 mL of methanol and 0.1 g of 2,6-tert-butyl-p-cresol, and then 1,200 g of TDAE was added, followed by stirring for 10 minutes. Thereafter, agglomerates were collected from the polymer solution by steam stripping. The agglomerates were dried under reduced pressure for 24 hours to obtain a modified SBR (SBR5). The modified SBR had a bound styrene content of 41% by mass, a Mw of 1,196,000, and a vinyl content of 40 mol %.

Production Example 3

(Non-oil-extended S-SBR)

An amount of 18 L of n-hexane, 540 g of styrene (Kanto Chemical Co., Inc.), 1,460 g of butadiene, and 17 mmol of tetramethylethylenediamine were charged into a 30-L pressure-proof vessel sufficiently purged with nitrogen, followed by heating to 40° C. Next, 10.5 mL of butyllithium was added and then the temperature was raised to 50° C., followed by stirring for 3 hours. Then, 3.5 mL of a 0.4 mol/L solution of silicon tetrachloride in hexane was added and stirred for 30 minutes. Then, 30 mL of the terminal modifier was added and stirred for 30 minutes. To the reaction solution was added 2 mL of a solution of 0.2 g of 2,6-tert-butyl-p-cresol (Ouchi Shinko Chemical Industrial Co., Ltd.) in methanol (Kanto Chemical Co., Inc.). The resulting reaction solution was put into a stainless steel container containing 18 L of methanol and then agglomerates were collected. The agglomerates were dried under reduced pressure for 24 hours to obtain a modified SBR (SBR6). The modified SBR had a bound styrene content of 28% by mass, a Mw of 717,000, and a vinyl content of 60 mol %.

Production Example 4

(Non-oil-extended S-SBR)

An amount of 18 L of n-hexane, 740 g of styrene (Kanto Chemical Co., Inc.), 1,260 g of butadiene, and 17 mmol of tetramethylethylenediamine were charged into a 30-L pressure-proof vessel sufficiently purged with nitrogen, followed by heating to 40° C. Next, 10.5 mL of butyllithium was added and then the temperature was raised to 50° C., followed by stirring for 3 hours. Then, 3.5 mL of a 0.4 mol/L solution of silicon tetrachloride in hexane was added and stirred for 30 minutes. Then, 30 mL of the terminal modifier was added and stirred for 30 minutes. To the reaction solution was added 2 mL of a solution of 0.2 g of 2,6-tert-butyl-p-cresol (Ouchi Shinko Chemical Industrial Co., Ltd.) in methanol (Kanto Chemical Co., Inc.). The resulting reaction solution was put into a stainless steel container containing 18 L of methanol and then agglomerates were collected. The agglomerates were dried under reduced pressure for 24 hours to obtain a modified SBR (SBR7). The modified SBR had a bound styrene content of 37.5% by mass, a Mw of 925,000, and a vinyl content of 55.8 mol %.

The chemicals used in examples and comparative examples are collectively listed below.

NR: TSR20

BR1: BUNA-CB21 (Nd-catalyzed BR, non-oil-extended) available from Lanxess

BR2: BUNA-CB24 (Nd-catalyzed BR, non-oil-extended) available from Lanxess

BR3: BUNA-CB29 TDAE (Nd-catalyzed BR, oil-extended) available from Lanxess

BR4: BUNA-CB29 MES (Nd-catalyzed BR, oil-extended) available from Lanxess

SBR1: Nipol 1723 (E-SBR, oil-extended) available from Zeon Corporation

SBR2: 0122 (E-SBR, oil-extended) available from JSR Corporation

SBR3: E-SBR (oil-extended) produced in Production Example 1

SBR4: Nipol 9548 (E-SBR, oil-extended) available from Zeon Corporation

SBR5: SBR modified for silica (oil-extended) produced in Production Example 2

SBR6: SBR modified for silica (non-oil-extended) produced in Production Example 3

SBR7: SBR modified for silica (non-oil-extended) produced in Production Example 4

Carbon black 1: Shoblack N220 ($N_2SA$: 114 $m^2/g$) available from Cabot Japan K. K.

Carbon black 2: Shoblack N134 ($N_2SA$: 134 $m^2/g$) available from Cabot Japan K. K.

Carbon black 3: HP160 ($N_2SA$: 165 $m^2/g$) available from Columbia Carbon

Carbon black 4: Trial product ($N_2SA$: 231 $m^2/g$, oil absorption number of compressed sample (COAN): 190 mL/100 g) available from Mitsubishi Chemical Corporation Silica: ULTRASIL VN3 ($N_2SA$: 175 $m^2/g$) available from Evonik Resin: NOVARES C10 (liquid coumarone-indene resin, softening point: 5° C. to 15° C.) available from Rutgers Chemicals Process oil: VivaTec 400 (TDAE oil) available from H&R Wax: Ozoace 0355 available from Nippon Seiro Co., Ltd.

Antioxidant 1: Antigene 6C (N-phenyl-N'-(1,3-dimethylbutyl)-p-phenylenediamine) available from Sumitomo Chemical Co., Ltd.

Vulcanization accelerator 2: Nocceler D (1,3-diphenylguanidine) available from Ouchi Shinko Chemical Industrial Co., Ltd.

Hybrid crosslinking agent: Vulcuren VP KA9188 (1,6-bis (N,N'-dibenzylthiocarbamoyldithio)hexane) (sulfur content: 20.6%) available from Lanxess Tables 1 and 2 below collectively show the values of the physical properties of the BR1 to BR4 and SBR1 to SBR7.

The following describes the method for measuring the weight average molecular weights (Mw) shown in Tables 1 and 2.

<Method for Measuring Weight Average Molecular Weight>

Weight average molecular weight (Mw) was measured by gel permeation chromatography (GPC) under the following conditions (1) to (8).

(1) Apparatus: HLC-8220 available from Tosoh Corporation
(2) Separation column: HM-H available from Tosoh Corporation, two columns in series
(3) Measurement temperature: 40° C.
(4) Carrier: tetrahydrofuran
(5) Flow rate: 0.6 mL/min
(6) Injection volume: 5 μL
(7) Detector: differential refractometer
(8) Molecular weight standards: polystyrene standards

TABLE 1

|  | Oil-extended/Non-oil-extended | Extender component | Amount of oil relative to 100 parts by mass of rubber component (parts by mass) | Catalyst used in synthesis | Cis content (mol %) | Vinyl content (mol %) | Weight average molecular weight (Mw) | Remarks |
|---|---|---|---|---|---|---|---|---|
| BR1 | Non-oil-extended | — | — | Nd | 97 | 1 | 1,177,000 | Lanxess |
| BR2 | Non-oil-extended | — | — | Nd | 97 | 0.7 | 541,000 | Lanxess |
| BR3 | Oil-extended | TDAE | 37.5 | Nd | 95.8 | 0.4 | 760,000 | Lanxess |
| BR4 | Oil-extended | MES | 37.5 | Nd | 96.1 | 0.4 | 737,000 | Lanxess |

TABLE 2

|  | Oil-extended/Non-oil-extended | Extender component | Amount of oil relative to 100 parts by mass of rubber component (parts by mass) | SBR | Bound styrene content (mass %) | Vinyl content (mol %) | Weight average molecular weight (Mw) | Remarks |
|---|---|---|---|---|---|---|---|---|
| SBR1 | Oil-extended | TDAE | 37.5 | E-SBR | 23.5 | 18 | 628,000 | Zeon Corporation |
| SBR2 | Oil-extended | TDAE | 34 | E-SBR | 36 | 18 | 945,000 | JSR Corporation |
| SBR3 | Oil-extended | TDAE | 37.5 | E-SBR | 45 | 18 | 786,000 | Production Example 1 |
| SBR4 | Oil-extended | TDAE | 37.5 | E-SBR | 35 | 18 | 1,085,000 | Zeon Corporation |
| SBR5 | Oil-extended | TDAE | 37.5 | SBR modified for silica | 41 | 40 | 1,196,000 | Production Example 2 |
| SBR6 | Non-oil-extended | — | — | SBR modified for silica | 28 | 60 | 717,000 | Production Example 3 |
| SBR7 | Non-oil-extended | — | — | SBR modified for silica | 37.5 | 55.8 | 925,000 | Production Example 4 |

Antioxidant 2: Nocrac 224 (2,2,4-trimethyl-1,2-dihydroquinoline polymer) available from Ouchi Shinko Chemical Industrial Co., Ltd.

Stearic acid: stearic acid "Tsubaki" available from NOF Corporation

Zinc oxide: Ginrei R available from Toho Zinc Co., Ltd.

Silane coupling agent: Si75 available from Evonik

Sulfur: HK-200-5 (5% oil-containing powdered sulfur) available from Hosoi Chemical Industry Co., Ltd.

Vulcanization accelerator 1: Nocceler NS-G (N-tert-butyl-2-benzothiazolylsulfenamide) available from Ouchi Shinko Chemical Industrial Co., Ltd.

EXAMPLES AND COMPARATIVE EXAMPLES

According to the formulations shown in Table 3, the total amounts of the rubber component and the carbon black and half the amounts of the silica and the silane coupling agent were first kneaded using a Banbury mixer at 150° C. for 5 minutes (X-kneading). Then, the remaining materials other than the sulfur, crosslinking agent, and vulcanization accelerators were added and kneaded at 150° C. for 4 minutes (Y-kneading), thereby obtaining a kneaded mixture. Then, the crosslinking agent and vulcanization accelerators were added to the kneaded mixture, and they were kneaded using an open roll mill at 105° C. for 4 minutes (F-kneading), thereby obtaining an unvulcanized rubber composition.

The unvulcanized rubber composition was press-vulcanized at 170° C. for 12 minutes to prepare a vulcanized rubber composition.

Separately, the unvulcanized rubber composition was extruded into the shape of a tread and assembled with other tire components on a tire building machine, followed by vulcanization at 170° C. for 12 minutes to prepare a test tire (tire size: 245/40R18, tire for passenger vehicles)

The vulcanized rubber compositions and test tires thus prepared were evaluated on the following items. Table 3 shows the evaluation results.

(Hardness)

The hardness (shore A) of the vulcanized rubber compositions at 23° C. was determined using a type-A durometer in conformity with JIS K 6253 "Rubber, vulcanized or thermoplastic—Determination of hardness".

To ensure safety (handling stability), the compositional formulations of the examples and comparative examples were controlled so that the compositions had a certain level of hardness. Adjusting the hardnesses to a certain level permits a proper comparison of the elongations at break.

(Fuel Economy)

The loss tangent, tan δ, of the vulcanized rubber compositions was measured using a viscoelastic spectrometer VES available from Iwamoto Seisakusho Co., Ltd. at a temperature of 30° C., a frequency of 10 Hz, an initial strain of 10%, and a dynamic strain of 2%. The tan δ values are expressed as an index, with Comparative Example 1 equal to 100. A higher index indicates better fuel economy. With an index of 90 or higher, the composition can be considered to have practically acceptable fuel economy.

(Wet-Grip Performance)

The test tires were mounted on a front-engine, rear-wheel-drive car of 2,000 cc displacement made in Japan. A test driver drove the car 10 laps around a test track with a wet asphalt surface and evaluated the control stability during the steering of the car. The results are expressed as an index, with Comparative Example 1 equal to 100. A higher index indicates better wet-grip performance. With an index of 90, the tire can be considered to have practically acceptable wet-grip performance.

(Abrasion Resistance)

The test tires were mounted on a front-engine, rear-wheel-drive car of 2,000 cc displacement made in Japan. The car was driven on a test track with a dry asphalt surface, and the remaining groove depth in the tread rubber of the tires was measured (initial groove depth 8.0 mm). The remaining groove depths are expressed as an index, with Comparative Example 1 equal to 100. A higher index indicates better abrasion resistance. With an index of 115 or higher, the tire can be considered to have practically acceptable abrasion resistance.

(Elongation at Break)

Tensile testing was performed at room temperature using No. 3 dumbbell specimens prepared from the vulcanized rubber compositions in conformity with JIS K 6251 "Rubber, vulcanized or thermoplastics—Determination of tensile stress-strain properties" to determine the elongation at break EB (%). A larger EB value indicates better durability. With an index of higher than 470, the composition can be considered to have practically acceptable durability.

TABLE 3

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Formulation (parts by mass) | Base kneading | | NR | — | — | — | — | — | — | — | — | — |
| | | | BR1 | — | — | — | — | — | — | — | — | — |
| | | | BR2 | — | 25 | — | — | — | — | — | — | — |
| | | BR3 | Amount of extender oil | 13.13 | 3.75 | 18.75 | 24.375 | 16.875 | 13.13 | 13.13 | 13.13 | 13.13 |
| | | | Amount of rubber component | 35 | 10 | 50 | 65 | 45 | 35 | 35 | 35 | 35 |
| | | BR4 | Amount of extender oil | — | — | — | — | — | — | — | — | — |
| | | | Amount of rubber component | — | — | — | — | — | — | — | — | — |
| | | | Total amount of BR (rubber component) | 35 | 35 | 50 | 65 | 45 | 35 | 35 | 35 | 35 |
| | | SBR1 | Amount of extender oil | 13.13 | 13.13 | — | — | 1.88 | 13.13 | 13.13 | 13.13 | 13.13 |
| | | | Amount of rubber component | 35 | 35 | — | — | 5 | 35 | 35 | 35 | 35 |
| | | SBR2 | Amount of extender oil | — | — | — | — | — | — | 10.2 | — | — |
| | | | Amount of rubber component | — | — | — | — | — | — | 30 | — | — |
| | | SBR3 | Amount of extender oil | — | — | — | — | — | — | — | 11.25 | — |
| | | | Amount of rubber component | — | — | — | — | — | — | — | 30 | — |
| | | SBR4 | Amount of extender oil | 11.25 | 11.25 | 11.25 | 13.125 | 18.75 | 5.63 | — | — | — |
| | | | Amount of rubber component | 30 | 30 | 30 | 35 | 50 | 15 | — | — | — |
| | | SBR5 | Amount of extender oil | — | — | — | — | — | — | — | — | 11.25 |
| | | | Amount of rubber component | — | — | — | — | — | — | — | — | 30 |
| | | | SBR6 | — | — | 20 | — | — | — | — | — | — |
| | | | SBR7 | — | — | — | — | — | 15 | — | — | — |
| | | | Total amount of SBR (rubber component) | 65 | 65 | 50 | 35 | 55 | 65 | 65 | 65 | 65 |
| | | | Carbon black 1 | 20 | 20 | 20 | 5 | 20 | 20 | 20 | 20 | 20 |
| | | | Carbon black 2 | — | — | — | — | — | — | — | — | — |
| | | | Carbon black 3 | 35 | 35 | 35 | 10 | 35 | 35 | 35 | 35 | 35 |
| | | | Carbon black 4 | — | — | — | — | — | — | — | — | — |
| | | | Total amount of carbon black | 55 | 55 | 55 | 15 | 55 | 55 | 55 | 55 | 55 |
| | | | Silica | 25 | 25 | 25 | 80 | 25 | 25 | 25 | 25 | 25 |

TABLE 3-continued

|  |  |  |  |  |  |  |  |  |  |  |
|---|---|---|---|---|---|---|---|---|---|---|
|  |  | Combined amount of silica and carbon black | 80 | 80 | 80 | 95 | 80 | 80 | 80 | 80 | 80 |
|  |  | Resin | — | — | 10 | 15 | — | — | — | — | — |
|  |  | Process oil | — | 7 | — | — | — | 5 | — | — | — |
|  |  | Amount of extender oil | 37.51 | 28.13 | 30 | 37.5 | 37.505 | 31.89 | 36.46 | 37.51 | 37.51 |
|  |  | Total amount of oil | 37.51 | 35.13 | 40 | 52.5 | 37.505 | 36.89 | 36.46 | 37.51 | 37.51 |
|  |  | Wax | 1.5 | 1.5 | 1.5 | 1.5 | 1.5 | 1.5 | 1.5 | 1.5 | 1.5 |
|  |  | Antioxidant 1 | 3 | 3 | 3 | 3 | 3 | 3 | 3 | 3 | 3 |
|  |  | Antioxidant 2 | 1 | 1 | 1 | 1 | 1 | 1 | 1 | 1 | 1 |
|  |  | Stearic acid | 3 | 3 | 3 | 3 | 3 | 3 | 3 | 3 | 3 |
|  |  | Zinc oxide | 2.5 | 2.5 | 2.5 | 2.5 | 2.5 | 2.5 | 2.5 | 2.5 | 2.5 |
|  |  | Silane coupling agent | 1.5 | 1.5 | 15 | 4.8 | 1.5 | 1.5 | 1.5 | 1.5 | 1.5 |
|  | Final kneading | Sulfur | 1.6 | 1.6 | 1.6 | 1.6 | 1.6 | 1.6 | 1.6 | 1.6 | 1.6 |
|  |  | Vulcanization accelerator 1 | 1.8 | 1.8 | 1.8 | 1.5 | 1.8 | 1.8 | 1.8 | 1.8 | 1.8 |
|  |  | Vulcanization accelerator 2 | 0.6 | 0.6 | 0.6 | 1.5 | 0.6 | 0.6 | 0.6 | 0.6 | 0.6 |
|  |  | Hybrid crosslinking agent | — | — | — | — | — | — | — | — | — |
|  |  | Hardness | | | | adjusted to 60 ± 1 | | | | | |
| Evaluation |  | Fuel economy index (Target ≥90) | 105 | 101 | 107 | 102 | 101 | 100 | 104 | 94 | 110 |
|  |  | Wet-grip performance index (Target ≥90) | 100 | 100 | 92 | 90 | 105 | 101 | 100 | 107 | 105 |
|  |  | Abrasion resistance index (Target ≥115) | 130 | 121 | 140 | 135 | 125 | 115 | 124 | 123 | 130 |
|  |  | Average of the above three performance indices (Target ≥105) | 112 | 107 | 113 | 109 | 110 | 105 | 109 | 108 | 115 |
|  |  | Elongation at break (Durability) (Target ≥470) | 575 | 555 | 545 | 475 | 560 | 535 | 555 | 550 | 565 |

|  |  |  |  | Example |  |  |  |  |  |  |  |  |
|---|---|---|---|---|---|---|---|---|---|---|---|---|
|  |  |  |  | 10 | 11 | 12 | 13 | 14 | 15 | 16 | 17 | 18 |
| Formulation (parts by mass) | Base kneading |  | NR | — | — | — | — | — | — | — | — | 15 |
|  |  |  | BR1 | — | — | — | — | — | — | — | — | — |
|  |  |  | BR2 | — | — | — | — | — | — | — | — | — |
|  |  | BR3 | Amount of extender oil | 13.13 | 13.13 | 13.13 | 13.13 | 13.13 | 13.13 | 13.13 | 13.13 | 7.5 |
|  |  |  | Amount of rubber component | 35 | 35 | 35 | 35 | 35 | 35 | 35 | 35 | 20 |
|  |  | BR4 | Amount of extender oil | — | — | — | — | — | — | — | — | — |
|  |  |  | Amount of rubber component | — | — | — | — | — | — | — | — | — |
|  |  |  | Total amount of BR (rubber component) | 35 | 35 | 35 | 35 | 35 | 35 | 35 | 35 | 20 |
|  |  | SBR1 | Amount of extender oil | 13.13 | 13.13 | 13.13 | 13.13 | 13.13 | 13.13 | 13.13 | 13.13 | 13.13 |
|  |  |  | Amount of rubber component | 35 | 35 | 35 | 35 | 35 | 35 | 35 | 35 | 35 |
|  |  | SBR2 | Amount of extender oil | — | — | — | — | — | — | — | — | — |
|  |  |  | Amount of rubber component | — | — | — | — | — | — | — | — | — |
|  |  | SBR3 | Amount of extender oil | — | — | — | — | — | — | — | — | — |
|  |  |  | Amount of rubber component | — | — | — | — | — | — | — | — | — |
|  |  | SBR4 | Amount of extender oil | 11.25 | 11.25 | 11.25 | 11.25 | 11.25 | — | 11.25 | 11.25 | 11.25 |
|  |  |  | Amount of rubber component | 30 | 30 | 30 | 30 | 30 | — | 30 | 30 | 30 |
|  |  | SBR5 | Amount of extender oil | — | — | — | — | — | 11.25 | — | — | — |
|  |  |  | Amount of rubber component | — | — | — | — | — | 30 | — | — | — |
|  |  |  | SBR6 | — | — | — | — | — | — | — | — | — |
|  |  |  | SBR7 | — | — | — | — | — | — | — | — | — |
|  |  |  | Total amount of SBR (rubber component) | 65 | 65 | 65 | 65 | 65 | 65 | 65 | 65 | 65 |
|  |  |  | Carbon black 1 | 60 | — | 20 | 20 | 20 | 20 | — | — | 20 |
|  |  |  | Carbon black 2 | — | — | — | — | — | — | 62 | 50 | — |
|  |  |  | Carbon black 3 | 10 | — | 35 | 35 | 35 | 35 | — | 7 | 35 |
|  |  |  | Carbon black 4 | — | 5 | — | — | — | — | — | — | — |
|  |  |  | Total amount of carbon black | 70 | 5 | 55 | 55 | 55 | 56 | 62 | 57 | 55 |
|  |  |  | Silica | 25 | 105 | 25 | 25 | 25 | 25 | 25 | 25 | 25 |
|  |  |  | Combined amount of silica and carbon black | 95 | 110 | 80 | 80 | 80 | 80 | 87 | 82 | 80 |
|  |  |  | Resin | 15 | 20 | — | — | — | — | — | — | — |
|  |  |  | Process oil | — | — | — | — | — | — | — | — | 4 |
|  |  |  | Amount of extender oil | 37.51 | 37.51 | 37.51 | 37.51 | 37.51 | 37.51 | 37.51 | 37.51 | 31.88 |
|  |  |  | Total amount of oil | 52.51 | 57.51 | 37.51 | 37.51 | 37.51 | 37.51 | 37.51 | 37.51 | 35.88 |
|  |  |  | Wax | 1.5 | 1.5 | 1.5 | 1.5 | 1.5 | 1.5 | 1.5 | 1.5 | 1.5 |
|  |  |  | Antioxidant 1 | 3 | 3 | 3 | 3 | 3 | 3 | 3 | 3 | 3 |
|  |  |  | Antioxidant 2 | 1 | 1 | 1 | 1 | 1 | 1 | 1 | 1 | 1 |
|  |  |  | Stearic acid | 3 | 3 | 3 | 3 | 3 | 3 | 3 | 3 | 3 |
|  |  |  | Zinc oxide | 2.5 | 2.5 | 2.5 | 2.5 | 2.5 | 2.5 | 2.5 | 2.5 | 2.5 |
|  |  |  | Silane coupling agent | 1.5 | 6.6 | 1.5 | 1.5 | 1.5 | 1.5 | 1.5 | 1.5 | 1.5 |

TABLE 3-continued

|  |  |  |  |  |  |  |  |  |  |  |
|---|---|---|---|---|---|---|---|---|---|---|
|  | Final kneading | Sulfur | 1.6 | 1.3 | 1.0 | 0.5 | 1.3 | 1.0 | 1.6 | 1.6 | 1.6 |
|  |  | Vulcanization accelerator 1 | 1.5 | 1.8 | 2.2 | 2.5 | 2.0 | 2.2 | 1.8 | 1.8 | 1.8 |
|  |  | Vulcanization accelerator 2 | 0.6 | 2.5 | 1.2 | 2 | 1.0 | 1.2 | 0.6 | 0.6 | 0.6 |
|  |  | Hybrid crosslinking agent | — | — | — | 2 | — | — | — | — | — |
|  |  | Hardness | adjusted to 60 ± 1 | | | | | | | | |
| Evaluation |  | Fuel economy index (Target ≥90) | 90 | 91 | 104 | 104 | 103 | 110 | 106 | 105 | 103 |
|  |  | Wet-grip performance index (Target ≥90) | 91 | 120 | 100 | 100 | 100 | 105 | 100 | 100 | 103 |
|  |  | Abrasion resistance index (Target ≥115) | 145 | 115 | 142 | 150 | 137 | 147 | 118 | 124 | 115 |
|  |  | Average of the above three performance indices (Target ≥105) | 109 | 109 | 115 | 118 | 113 | 121 | 108 | 110 | 107 |
|  |  | Elongation at break (Durability) (Target ≥470) | 545 | 570 | 605 | 635 | 585 | 565 | 540 | 550 | 575 |

|  |  |  |  | Example | | | Comparative Example | | | | | |
|---|---|---|---|---|---|---|---|---|---|---|---|---|
|  |  |  |  | 19 | 20 | 21 | 1 | 2 | 3 | 4 | 5 | 6 |
| Formulation (parts by mass) | Base kneading | | NR | — | — | — | — | — | — | — | — | — |
|  |  | | BR1 | — | — | — | — | — | — | — | — | 35 |
|  |  | | BR2 | — | — | — | 35 | 35 | 28 | — | — | — |
|  |  | BR3 | Amount of extender oil | — | — | 13.13 | — | — | 2.45 | 26.5 | 15 | — |
|  |  | | Amount of rubber component | — | — | 35 | — | — | 7 | 70 | 40 | — |
|  |  | BR4 | Amount of extender oil | 13.13 | 24.375 | — | — | — | — | — | — | — |
|  |  | | Amount of rubber component | 35 | 65 | — | — | — | — | — | — | — |
|  |  | | Total amount of BR (rubber component) | 35 | 65 | 35 | 35 | 35 | 35 | 70 | 40 | 35 |
|  |  | SBR1 | Amount of extender oil | 13.13 | — | 13.13 | 13.13 | 13.13 | 13.13 | — | — | 13.13 |
|  |  | | Amount of rubber component | 35 | — | 35 | 35 | 35 | 35 | — | — | 35 |
|  |  | SBR2 | Amount of extender oil | — | — | — | — | — | — | — | — | — |
|  |  | | Amount of rubber component | — | — | — | — | — | — | — | — | — |
|  |  | SBR3 | Amount of extender oil | — | — | — | — | — | — | — | — | — |
|  |  | | Amount of rubber component | — | — | — | — | — | — | — | — | — |
|  |  | SBR4 | Amount of extender oil | 11.25 | 13.125 | 2.63 | — | 11.25 | 11.25 | 11.25 | 22.5 | — |
|  |  | | Amount of rubber component | 30 | 35 | 7 | — | 30 | 30 | 30 | 60 | — |
|  |  | SBR5 | Amount of extender oil | — | — | — | — | — | — | — | — | — |
|  |  | | Amount of rubber component | — | — | — | — | — | — | — | — | — |
|  |  | | SBR6 | — | — | — | — | — | — | — | — | — |
|  |  | | SBR7 | — | — | 23 | 30 | — | — | — | — | 30 |
|  |  | | Total amount of SBR (rubber component) | 65 | 35 | 65 | 65 | 65 | 65 | 30 | 60 | 65 |
|  |  | | Carbon black 1 | 20 | 5 | 10 | 20 | 20 | 20 | 10 | 20 | 20 |
|  |  | | Carbon black 2 | — | — | — | — | — | — | — | — | — |
|  |  | | Carbon black 3 | 35 | 10 | 45 | 35 | 35 | 35 | 20 | 35 | 35 |
|  |  | | Carbon black 4 | — | — | — | — | — | — | — | — | — |
|  |  | | Total amount of carbon black | 55 | 15 | 55 | 55 | 55 | 55 | 30 | 55 | 55 |
|  |  | | Silica | 25 | 80 | 25 | 25 | 25 | 25 | 60 | 25 | 25 |
|  |  | | Combined amount of silica and carbon black | 80 | 95 | 80 | 80 | 80 | 80 | 90 | 80 | 80 |
|  |  | | Resin | — | 15 | 10 | — | — | — | — | — | — |
|  |  | | Process oil | — | — | — | 24 | 13 | 9 | — | — | 24 |
|  |  | | Amount of extender oil | 37.51 | 37.5 | 28.89 | 13.13 | 24.38 | 26.83 | 37.75 | 37.5 | 13.13 |
|  |  | | Total amount of oil | 37.51 | 52.5 | 38.89 | 37.13 | 37.38 | 35.83 | 37.75 | 37.5 | 37.13 |
|  |  | | Wax | 1.5 | 1.5 | 1.5 | 1.5 | 1.5 | 1.5 | 1.5 | 1.5 | 1.5 |
|  |  | | Antioxidant 1 | 3 | 3 | 3 | 3 | 3 | 3 | 3 | 3 | 3 |
|  |  | | Antioxidant 2 | 1 | 1 | 1 | 1 | 1 | 1 | 1 | 1 | 1 |
|  |  | | Stearic acid | 3 | 3 | 3 | 3 | 3 | 3 | 3 | 3 | 3 |
|  |  | | Zinc oxide | 2.5 | 2.5 | 2.5 | 2.5 | 2.5 | 2.5 | 2.5 | 2.5 | 2.5 |
|  |  | | Silane coupling agent | 1.5 | 4.8 | 1.5 | 1.5 | 1.5 | 1.5 | 3.6 | 1.5 | 1.5 |
|  | Final kneading | | Sulfur | 1.6 | 1.6 | 1.6 | 1.6 | 1.6 | 1.6 | 1.6 | 1.6 | 1.6 |
|  |  | | Vulcanization accelerator 1 | 1.8 | 1.5 | 1.8 | 1.8 | 1.8 | 1.8 | 1.5 | 1.8 | 1.8 |
|  |  | | Vulcanization accelerator 2 | 0.6 | 1.5 | 0.6 | 0.6 | 0.6 | 0.6 | 1.0 | 0.6 | 0.6 |
|  |  | | Hybrid crosslinking agent | — | — | — | — | — | — | — | — | — |
|  |  | | Hardness | adjusted to 60 ± 1 | | | | | | | | |
| Evaluation |  | | Fuel economy index (Target ≥90) | 106 | 104 | 100 | 100 | 100 | 100 | 98 | 95 | 97 |
|  |  | | Wet-grip performance index (Target ≥90) | 98 | 90 | 100 | 100 | 101 | 100 | 90 | 103 | 95 |
|  |  | | Abrasion resistance index (Target ≥115) | 127 | 131 | 116 | 100 | 111 | 105 | 105 | 112 | 95 |

TABLE 3-continued

| | | | | | | | | | |
|---|---|---|---|---|---|---|---|---|---|
| Average of the above three performance indices (Target ≥105) | 110 | 108 | 105 | 100 | 104 | 102 | 98 | 103 | 96 |
| Elongation at break (Durability) (Target ≥470) | 555 | 475 | 535 | 495 | 515 | 520 | 440 | 545 | 450 |

As demonstrated in Table 3, in the examples in which a specific oil-extended BR and a specific SBR were used as the rubber component in the compounded rubber containing both silica and carbon black as fillers, abrasion resistance was greatly improved while maintaining good fuel economy and good wet-grip performance and thus the balance of these properties was markedly improved and, at the same time, excellent durability was exhibited. Moreover, since predetermined amounts of silica and carbon black were added in the compositions, the improved balance of the properties was achieved without any need to increase the amount of silane coupling agent, and thus the compositions had good cost efficiency.

The invention claimed is:

1. A pneumatic tire comprising a tread formed from a rubber composition,
the rubber composition comprising:
an oil-extended polybutadiene rubber having a cis content of 95 mol % or more, a vinyl content of 1 mol % or less, and a weight average molecular weight of 700,000 to 950,000;
a styrene-butadiene rubber having a bound styrene content of 34 to 46% by mass and a weight average molecular weight of 700,000 to 1,300,000;
silica; and
carbon black,
wherein
the oil-extended polybutadiene rubber is synthesized using a rare earth catalyst, and an extender component of the oil-extended polybutadiene rubber is one selected from the group consisting of paraffinic oil, aromatic oil, naphthenic oil, mild extraction solvates, and treated distillate aromatic extracts,
the rubber composition comprises, based on 100% by mass of rubber solids, 10 to 67% by mass of a polybutadiene rubber component contained in the oil-extended polybutadiene rubber and 10 to 50% by mass of the styrene-butadiene rubber,
the silica is present in an amount of 15 to 125 parts by mass, and the carbon black is present in an amount of 3 to 70 parts by mass, relative to 100 parts by mass of the rubber solids, and
the oil-extended polybutadiene rubber comprises the extender component present in an amount of 10 to 50 parts by mass relative to 100 parts by mass of a polybutadiene rubber component.

2. The pneumatic tire according to claim 1, wherein the rubber composition comprises 10 parts to 70 parts by mass of carbon black having a nitrogen adsorption specific surface area of 130 m$^2$/g or more relative to 100 parts by mass of the rubber solids.

3. The pneumatic tire according to claim 1, wherein relative to 100 parts by mass of the rubber solids, a combined amount of the silica and the carbon black is 60 to 135 parts by mass.

4. The pneumatic tire according to claim 3, wherein a total amount of sulfur derived from crosslinking agents is 0.5 to 1.4 parts by mass relative to 100 parts by mass of the rubber solids.

5. The pneumatic tire according to claim 3, wherein the styrene-butadiene rubber is an oil-extended emulsion-polymerized styrene-butadiene rubber having a weight average molecular weight of 900,000 to 1,300,000.

6. The pneumatic tire according to claim 3, wherein the rubber composition further comprises additionally added oil in an amount of 7 parts by mass or less relative to 100 parts by mass of the rubber solids.

7. The pneumatic tire according to claim 3, wherein the rubber composition comprises 10 parts to 70 parts by mass or more of carbon black having a nitrogen adsorption specific surface area of 130 m$^2$/g or more relative to 100 parts by mass of the rubber solids.

8. The pneumatic tire according to claim 1, wherein a total amount of sulfur derived from crosslinking agents is 0.5 to 1.4 parts by mass relative to 100 parts by mass of the rubber solids.

9. The pneumatic tire according to claim 8, wherein the styrene-butadiene rubber is an oil-extended emulsion-polymerized styrene-butadiene rubber having a weight average molecular weight of 900,000 to 1,300,000.

10. The pneumatic tire according to claim 8, wherein the rubber composition further comprises additionally added oil in an amount of 7 parts by mass or less relative to 100 parts by mass of the rubber solids.

11. The pneumatic tire according to claim 8, wherein the rubber composition comprises 10 parts to 70 parts by mass or more of carbon black having a nitrogen adsorption specific surface area of 130 m$^2$/g or more relative to 100 parts by mass of the rubber solids.

12. The pneumatic tire according to claim 1, wherein the styrene-butadiene rubber is an oil-extended emulsion-polymerized styrene-butadiene rubber having a weight average molecular weight of 900,000 to 1,300,000.

13. The pneumatic tire according to claim 12, wherein the rubber composition further comprises additionally added oil in an amount of 7 parts by mass or less relative to 100 parts by mass of the rubber solids.

14. The pneumatic tire according to claim 12, wherein the rubber composition comprises 10 parts to 70 parts by mass or more of carbon black having a nitrogen adsorption specific surface area of 130 m$^2$/g or more relative to 100 parts by mass of the rubber solids.

15. The pneumatic tire according to claim 1, wherein the rubber composition further comprises additionally added oil in an amount of 7 parts by mass or less relative to 100 parts by mass of the rubber solids.

16. The pneumatic tire according to claim 15, wherein the rubber composition comprises 10 parts to 70 parts by mass or more of carbon black having a nitrogen adsorption specific surface area of 130 m$^2$/g or more relative to 100 parts by mass of the rubber solids.

* * * * *